(12) United States Patent
Haley

(10) Patent No.: US 8,709,611 B2
(45) Date of Patent: Apr. 29, 2014

(54) MULTILAYER FILMS HAVING REDUCED CURLING

(75) Inventor: Jeffrey C. Haley, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 204 days.

(21) Appl. No.: 12/802,523

(22) Filed: Jun. 8, 2010

(65) Prior Publication Data
US 2011/0300391 A1    Dec. 8, 2011

(51) Int. Cl.
B32B 27/08    (2006.01)
B32B 27/00    (2006.01)
B32B 27/30    (2006.01)
B32B 27/32    (2006.01)
B29C 65/00    (2006.01)

(52) U.S. Cl.
USPC ............... 428/516; 428/474.4; 428/476.9; 428/522; 428/523; 156/60

(58) Field of Classification Search
None
See application file for complete search history.

(56) References Cited

U.S. PATENT DOCUMENTS

| | | | |
|---|---|---|---|
| 4,906,172 A * | 3/1990 | Stewart | 425/174.4 |
| 6,306,996 B1 | 10/2001 | Cecchin et al. | |
| 6,716,928 B2 | 4/2004 | Botros | |
| 7,569,630 B2 * | 8/2009 | Ma et al. | 524/221 |
| 2004/0038055 A1 | 2/2004 | Hawighorst | |
| 2008/0227900 A1 * | 9/2008 | Borke et al. | 524/388 |
| 2009/0029182 A1 * | 1/2009 | Aubee et al. | 428/476.9 |

OTHER PUBLICATIONS

Barry A. Morris, DuPont, Wilmington, Delaware, "Reducing Curl in Multilayer Blown Film. Part I: Experimental Results, Model Development and Strategies," *Presented at 2001 TAPPI Polymers, Laminations and Coatings Conference*, Aug. 27-30, 2001.

Barry A. Morris, DuPont, Wilmington, Delaware, "Reducing Curl in Multilayer Blown Film. Part II: Application of Predictive Modeling to a Barrier Cereal Liner Film," *Presented at 2001 TAPPI Polymers, Laminations and Coatings Conference*, Aug. 27-30, 2001.

PCT International Search Report and the Written Opinion—Mailed Nov. 21, 2011 for Corresponding PCT/IB2011/001680.

* cited by examiner

*Primary Examiner* — Sheeba Ahmed

(57) ABSTRACT

Disclosed is a multilayer film. The multilayer film has the general structure of A/B/A/C or B/A/B/C, wherein A is a nucleated high density polyethylene (HDPE) layer, B is a single or multilayer structure, and C is a seal layer. Adding a nucleating agent to HDPE improves the water vapor barrier property of the HDPE layer and the multilayer film, but it also causes the multilayer film to curl in the conventional multilayer film structures. The invention provides a multilayer film, which includes at least one layer of nucleated HDPE, with reduced or eliminated curling while retaining high water vapor barrier.

15 Claims, No Drawings

MULTILAYER FILMS HAVING REDUCED CURLING

FIELD OF THE INVENTION

The invention relates to a multilayer film. More particularly, the invention relates to a multilayer film that possesses good water vapor barrier property and reduced curling.

BACKGROUND OF THE INVENTION

Polyethylene is widely used to prepare food packaging films and bags such as cereal liners and cake mix bags, grocery bags, stretch-wraps, shrink-wraps, garbage can liners, and shipping bags. Some applications, such as food packaging films and bags, require films to have sufficient water vapor and oxygen barrier properties to preserve the contents. The packaging films usually have a multilayer structure. Depending on the intended application, the number, type, and arrangement of layers employed will vary. Ethylene-vinyl alcohol (EVOH) copolymers and polyamides (nylons) are often used as barrier layers. Polyethylene is often used as one or more layers.

High density polyethylene (HDPE) is often used as a layer in the multilayer films because of its high strength and modulus. HDPE can be nucleated. Nucleated HDPE has improved water vapor barrier property. Thus when nucleated HDPE is used as a layer in a multilayer film, it provides the film not only with physical strength but also with increased barrier to water vapor. One problem associated with the use of nucleated HDPE in a multilayer film is that nucleated HDPE causes the multilayer films to curl to a greater extent. The curling brings inconvenience to the film manufacturers and consumers. Therefore, there is a need to reduce or eliminate the curling of multilayer film caused by the use of nucleated HDPE.

SUMMARY OF THE INVENTION

The invention relates to a multilayer film. By "film," I mean to include both films (which are normally referred to those having a thickness less than or equal to 10 mils) and sheets (which are normally referred to those having a thickness greater than 10 mils). The multilayer film of the invention has the general structure of A/B/A/C or B/A/B/C, wherein A is a nucleated high density polyethylene (HDPE) layer, B is a single or multilayer structure, and C is a seal layer. Preferably the seal layer C is selected from the group consisting of linear low density polyethylenes (LLDPE), low density polyethylenes (LDPE), ethylene-vinyl acetate copolymers (EVA), polyolefin ionomers, the like, and mixtures thereof. Adding a nucleating agent to HDPE improves the water vapor barrier property of the HDPE layer and the multilayer film thereby. However, nucleated HDPE causes the multilayer film to curl to a greater extent in the conventional multilayer film structures. The invention provides a multilayer film, which includes at least one layer of nucleated HDPE, with reduced or eliminated curling while retaining high water vapor barrier.

DETAILED DESCRIPTION OF THE INVENTION

The invention is a multilayer film. The multilayer film has the general structure of A/B/A/C or B/A/B/C, wherein A is a nucleated high density polyethylene (HDPE) layer, B is a single or multilayer structure, and C is a seal layer. By "nucleated HDPE," I mean that the HDPE contains a nucleating agent. Unless specified as "nucleated HDPE," in this application, the term HDPE refers only to those which do not contain nucleating agents. By "seal layer," I mean the layer of the multilayer film which softens at lower temperature than the rest layers of the film structure, so that the film can be heat sealed. Seal layer may directly contact with the goods, such as meat or vegetables, protected by the multilayer film.

Suitable nucleated HDPE comprises a nucleating agent and an HDPE resin. Suitable HDPE for making the nucleated HDPE includes ethylene homopolymers and copolymers of ethylene and α-olefins. Suitable α-olefins include 1-butene, 1-hexene, and 1-octene, the like, and mixtures thereof. Preferably, the α-olefin content in the nucleated HDPE is less than 2 wt %. The nucleated HDPE has a density preferably within the range of 0.940 to 0.970 g/cm$^3$, and more preferably within the range of 0.945 to 0.965 g/cm$^3$. The nucleated HDPE has a melt index MI$_2$ preferably within the range of 0.001 to 100 dg/min, and more preferably within the range of 0.05 to 50 dg/min. Density is measured according to ASTM D1505; and MI$_2$ is measured according to ASTM D 1238 at 190° C. and 2.16 kg. Unless specifically mentioned, all density and MI$_2$ in this application are measured according to these ASTM methods.

The nucleated HDPE can be multimodal. By "multimodal," I mean that the nucleated HDPE comprises at least two components, one of which has a relatively low molecular weight, and the other which has a relatively high molecular weight. Many HDPE resins are commercially available; for instance L5885 and M6020 HDPE are resins from Equistar Chemicals, LP. They can be readily nucleated by a nucleating agent.

Suitable nucleating agents for making the nucleated HDPE include those known to the industry. Preferably, the nucleating agents are selected from the group consisting of glycerol alkoxide salts, hexahydrophthalic acid salts, the like, and mixtures thereof. The salts include ammonium and metal salts. Preferably, the glycerol alkoxide salt is selected from the group consisting of zinc, magnesium, and calcium glycerolates and mixtures thereof. More preferably, the glycerol alkoxide salt is a zinc glycerolate. Preferably, the hexahydrophthalic acid salt is selected from the group consisting of zinc, magnesium, and calcium hexahydrophthalates, the like, and mixtures thereof. More preferably, the hexahydrophthalic acid salt is calcium hexahydrophthalate. Many glycerol alkoxide salts and hexahydrophthalic acid salts are commercially available. For instance, zinc glycerolate is available from Ciba Specialty Chemicals as Irgastab® 287. Calcium hexahydrophthalate is available from Milliken Company as Hyperform® HPN-20E. The amount of nucleating agent used in the nucleated HDPE varies depending on many factors such as the nucleating agent type, the properties of the HDPE, and the targeted improvement of the barrier properties. In general, the nucleating agent is used in an amount within the range of 0.01 to 1 wt % of the HDPE. Preferably, the amount of the nucleating agent is within the range of 0.05 to 0.5 wt % of the HDPE.

The seal layer C is preferably selected from the group consisting of linear low density polyethylene (LLDPE), low density polyethylene (LDPE), ethylene-vinyl acetate copolymers (EVA), polyolefin ionomers, the like, and mixtures thereof. Suitable LLDPE resins include copolymers of ethylene and α-olefins. Suitable α-olefins include 1-butene, 1-hexene, and 1-octene, the like, and mixtures thereof. The α-olefin content in the LLPDE is preferably within the range of 5 to 15 wt %. The LLDPE has a density preferably within the range of 0.865 to 0.935 g/cm$^3$, and more preferably within the range 0.905 to 0.935 g/cm$^3$. The LLDPE has a melt index MI$_2$ preferably within the range of 0.5 to 50 dg/min, and more preferably within the range of 1 to 15 dg/min. Many LLDPE resins are commercially available; for instance GS707 LLDPE and GA501 are from Equistar Chemicals, LP.

Suitable LDPE for use in the invention include those known to the industry. LDPE is usually made by free radical polymerization under high pressure. There are two basic processes for the manufacture of LDPE: autoclave and tubular. Both autoclave LDPE and tubular LDPE are suitable for use in the invention. The LDPE has a density preferably within the range of 0.915 to 0.935 g/cm$^3$, and more preferably within the range of 0.918 to 0.932 g/cm$^3$. The LDPE has a melt index MI$_2$ preferably within the range of 0.1 to 100 dg/min, and more preferably within the range of 0.5 to 50 dg/min. Many LDPE resins are commercially available and suitable for use as a seal layer. An example of suitable LDPE resin is Petrothene NA860 from Equistar Chemicals, LP. Ethylene-vinyl acetate copolymers (EVA) are made by the free radical copolymerization of ethylene and vinyl acetate. Suitable EVA comprises preferably from 2 to 30 wt % of vinyl acetate, and more preferably from 5 to 18 wt % of vinyl acetate. The suitable EVA has a melt index MI$_2$ preferably within the range of 2 to 500 dg/min. Many EVA resins are commercially available; for instance, EVA UE624 is a product of Equistar Chemicals, LP. Suitable polyolefin ionomers include ammonium and metal salts of olefin-acrylic acid and olefin-methacrylic acid copolymers. Examples are sodium, zinc, and magnesium salts of ethylene-acrylic acid copolymers and ethylene-methacrylic acid copolymers. Many polyolefin ionomers are commercially available; for instance, the Surlyn® ionomers is from Du Pont Chemical Company.

Layer B can be a single layer or a multilayer structure. When B is a single layer, it is preferably a polyolefin layer. Suitable polyolefin for use as a B layer in the multilayer film of the invention is preferably selected from the group consisting of polyethylene, polypropylene, and poly1-butene. Suitable polyethylene include the above-discussed HDPE, LLDPE, and LDPE, the like, and mixtures. Suitable polypropylene includes amorphous polypropylene, semi-crystalline polypropylene, the like, and mixtures thereof. Preferably, the semi-crystalline polypropylene is selected from the group consisting of propylene homopolymers, copolymers of propylene with at least one other C$_2$ to C$_{10}$ α-olefin, the like, and mixtures thereof. Copolymers of propylene include random copolymers and impact copolymers. Preferred α-olefins for such copolymers include ethylene, 1-butene, 1-pentene, 1-hexene, methyl-1-butenes, methyl-1-pentenes, 1-octene, 1-decene, the like, and mixtures thereof. "Semi-crystalline," as used herein, means that the crystallinity is greater than or equal to 40%, preferably greater than or equal to 55%, and more preferably greater than or equal to 80%. Preferably, the semi-crystalline polypropylene has a melt flow rate (as determined by ASTM D-1238-01 at a temperature of 230° C. and at a load of 2.16 kg) within the range of 0.001 to 500 dg/min. Preferably, the semi-crystalline polypropylene has a density within the range of 0.897 to 0.925 g/cm$^3$ and a weight average molecular weight (Mw) within the range of 85,000 to 900,000. Suitable poly1-butene includes homopolymers of 1-butene, copolymers of 1-butene with at least one other C$_2$ to C$_{10}$ α-olefin, the like, and mixtures thereof. Preferred α-olefins for such copolymers include ethylene, propylene, 1-pentene, 1-hexene, methyl-1-butenes, methyl-1-pentenes, 1-octene, 1-decene, the like, and mixtures thereof. The poly1-butene has a melt index preferably within the range of 0.01 to 1000 dg/min, more preferably within the range of 0.1 to 750 dg/min. Methods for producing poly1-butene are known. For instance, see U.S. Pat. No. 6,306,996; the teachings of this patent are herein incorporated by reference. Polyethylene is a preferred polyolefin for use as a B layer. HDPE and LLDPE are particularly preferred.

When B layer is a multilayer structure, B preferably has a structure of tie layer/barrier layer/tie layer and the multilayer film preferably has a structure of A/B/NC. Tie layer is also called tie layer adhesive or adhesive layer. Preferably the tie layer resin comprises a maleated polyolefin. It comprises preferably from 0.5 to 25 wt %, preferably 5 to 20 wt %, and more preferably 5 to 15 wt %, of a maleated polyolefin. Suitable maleated polyolefin for use as a tie layer in the invention include maleated polyethylene, maleated polypropylene, and maleated poly1-butene. Methods for maleating polyolefin are known. For instance, U.S. Pat. No. 6,716,928, the teachings of which are incorporated herein by reference, teaches maleating a propylene impact copolymer. Suitable polyethylene, polypropylene, and poly1-butene for making the maleated polyolefin include those discussed above. Preferably, the maleated polyolefin is a maleated HDPE. The maleated polyolefin contains preferably from 0.1 to 10 wt %, more preferably from 0.5 to 5 wt %, and most preferably from 1 to 2.5 wt %, of grafted maleic anhydride. Preferably the tie layer resin comprises an elastomer. Suitable elastomers include olefin-based elastomers and conjugated diene-based elastomers. By "olefin elastomer," I mean any olefin polymers or copolymers which have elastomeric characteristics. Suitable polyolefin elastomers include ethylene-propylene rubber, ethylene-acrylate rubber, ethylene-1-butene rubber, ethylene-propylene-diene rubber (EPDM), polyethylene plastomers, elastoplastic polypropylene or impact polypropylene, the like, and mixtures thereof. Preferably the polyolefin elastomers are selected from the group consisting of ethylene-propylene rubber, ethylene-1-butene rubber, EPDM, the like, and mixtures thereof. Ethylene-propylene rubber is particularly preferred. By "conjugated diene-based elastomer," I mean any conjugated diene-containing polymers and copolymers which have a glass transition temperature (T$_g$) below room temperature (25° C.). In other words, the conjugated diene-containing polymers and copolymers are in elastomeric or rubber state at room temperature. Examples of conjugated diene-based elastomers include polybutadiene, polyisoprene, butadiene-vinyl aromatic random and block copolymers, isoprene-vinyl aromatic random and block copolymers, hydrogenated butadiene-vinyl aromatic block copolymers, hydrogenated isoprene-vinyl aromatic block copolymers, the like, and mixtures thereof. Preferably, the conjugated diene-based elastomers are selected from the group consisting of butadiene-styrene block copolymers, isoprene-styrene block copolymers, hydrogenated butadiene-styrene block copolymers, hydrogenated isoprene-styrene block copolymers, the like, and mixture thereof. More preferably, the conjugated diene-based elastomers are selected from the group consisting of styrene-butadiene-styrene triblock copolymers (SBS), styrene-isoprene-styrene triblock copolymers (SIS), the like, and mixtures thereof. SBS is particularly preferred. The tie layer resin comprises preferably from 15 to 65 wt %, more preferably from 25 to 55 wt %, and most preferably from 25 to 45 wt %, of the elastomer. The tie layer resin preferably comprises a base resin in an amount within the range of 35 to 95 wt % of the tie layer resin. LLDPE is a preferred based resin for the tie layer. Suitable LLDPE includes those which are discussed above.

Suitable barrier layer includes any polymers which provide water vapor or oxygen barrier properties. Suitable barrier layer is preferably selected from the group consisting of ethylene-vinyl alcohol copolymers (EVOH), polyamides (nylons), the like, and mixture thereof. Suitable polyamides include nylon 6, nylon 6,6, nylon 12, nylon 6,12, nylon 6,66, the like, and mixtures thereof. EVOH is made by saponification/hydrolysis of EVA. Suitable EVOH contains preferably from 30 to 50 molar % of vinyl alcohol.

The multilayer film of the invention can be made by a variety of processes. It can be made by co-extrusion, coating, and other laminating processes. The film can be made by casting or blown film processes. Blown film processes include high-stalk and in-pocket processes. In a high-stalk process, the extrudate exits the annular opening in the die in the form of a tubular "stalk" that is inflated a distance (usually the length of the stalk) from the extrusion die. For an in-pocket blown process, the tube is inflated as the tube exits the extrusion die. After the tube is flattened and cooled, it can be slit to form a film.

The invention includes a method for reducing or eliminating the curling of a multilayer film having the general structure of A/B/C. The method comprises adding a layer to the multilayer film to form a new film structure of A/B/NC or B/A/B/C. Layers A, B, and C are discussed above.

The multilayer thin film of the invention has many uses. It is particularly useful for food packaging films and bags where low curling and low water vapor permeation rate are required, including cereal liners and cake mix bags.

The following examples merely illustrate the invention. Those skilled in the art will recognize many variations that are within the spirit of the invention and scope of the claims.

Comparative Example 1

A three-layer film, A/B/C, is produced using a blown film line capable of producing films with up to seven layers. The film is produced at a rate of 200 lb/hr, using a 0.095 inch thick die gap, a frost line height of 15 inches, and a blow up ratio of 2.5:1. The film is 0.002 inch thick. Resins A and C are the outer layers of the film and Resin B is the center layer of the film. Resin A is a nucleated HDPE. The HDPE is an ethylene homopolymer having a density of 0.960 g/cm$^3$ and a melt index MI$_2$ of 2.0 dg/min. Resin A contains 500 ppm of a nucleating agent (Hyperform® HPN-20E is from Milliken and Company). The nucleating agent is used to improve the water vapor barrier properties of the film. Resin B is an HDPE copolymer with a density of 0.947 g/cm$^3$ and MI$_2$ of 1.1 dg/min. Resin C is an LDPE with a density of 0.920 g/cm$^3$ and a MI$_2$ of 1.0 dg/min. The percentage of the total film taken by each layer in the A/B/C film structure is 35%/50%/15%.

Film curling is characterized by cutting a 2 inch×2 inch "X" into each film, where the two cuts of the X are perpendicular. Each cut is oriented with a 45 degree angle to both the machine and transverse directions. The two cuts produce four triangles, which are then free to curl. The X is oriented so that two of the triangles curl only in the machine direction of the film, and two of the triangles curled only in the transverse direction. The films are mounted onto a rigid substrate and allowed to curl for 20 hours. After 20 hours, the direction of curl (either towards or away from the side of the film with resin C) is noted, and the radii of curvature of the curl in both the machine and transverse directions are measured. A larger radius of curvature in this measurement indicates less curl. When films curl by an amount that is more than 90 degrees, the radius of curvature is measured directly. When films curl less than 90 degrees, it is difficult to measure the radius directly. In these cases, the radius of curvature is determined by measuring the distance, l, from the base of the triangle to its free point and the distance, w, from the base of the triangle to the projection of the free point into the plane of the film. With these two dimensions, the radius of curvature, r, is calculated numerically using the equation $$\frac{w}{r} = \sin\left(\frac{l}{r}\right)$$

The curl direction and radius of curvature in the machine (MD) and transverse (TD) directions of this film are tabulated in Table 1. Comparative Example 1 shows a very large tendency to curl, as indicated by its very small radius of curvature in both of the machine and transverse directions. This film curls towards the C layer direction. Water vapor transmission rate is measured at 100% relative humidity following the method of ASTM F1249. The 1% secant modulus in the machine direction is measured following the method of ASTM E111. Water vapor transmission rate and modulus are tabulated in Table 1.

Example 2

A four-layer film is produced using the same film equipment and processing conditions as used in Comparative Example 1. This film has the same total thickness as the film in Comparative Example 1 (0.002 in). Identical resins A, B and C are used to produce this film structure. The four layer structure is arranged as an A/B/NC film, where the percentage of the total film in each layer is 7%/50%/28%/15%. The total fraction of the film taken up by the combined A layers is 35%, which is identical to the A fraction in Comparative Example 1. Curl testing is performed on Example 2 in a manner identical to the test used on Comparative Example 1, and the results are presented in Table 1. Example 2 curls away from the C layer direction (the direction opposite of the curl direction of Comparative example 1). Example 2 curls less than Comparative Example 1, as indicated by the much higher radii of curvature. Water vapor transmission rate is measured at 100% relative humidity following the method of ASTM F1249. The 1% secant modulus in the machine direction is measured following the method of ASTM E111. Water vapor transmission rate and modulus are tabulated in Table 1. The water vapor transmission rate and modulus are essentially the same as Comparative Example 1.

Example 3

A four-layer film is produced using the same film equipment and processing conditions as used in Comparative Example 1. This film has the same thickness as the film in Comparative Example 1 (0.002 in). Identical resins A, B and C are used to produce this film structure. The four-layer structure is arranged as an A/B/A/C film, where the percentage of the total film in each layer was 15%/50%/20%/15%. The total fraction of the film taken up by the combined A layers is 35%, which is identical to the A fraction in Comparative Example 1. Curl testing is performed on Example 3 in a manner identical to the test used on Comparative Example 1, and the results are presented in Table 1. Example 3 curls toward the C layer direction (the same direction as the curl direction of Comparative Example 1, and the opposite direction as the curl direction in Example 2). Example 3 curls less than Comparative Example 1, as indicated by the much higher radii of curvature. Water vapor transmission rate is measured at 100% relative humidity following the method of ASTM F1249. The 1% secant modulus in the machine direction was measured following the method of ASTM E111.

Water vapor transmission rate and modulus are tabulated in Table 1. The water vapor transmission rate and modulus are essentially the same as Comparative Example 1.

Comparative Example 4

A three-layer film is produced using the same film equipment and processing conditions as used in Comparative Example 1. This film has the same thickness as Comparative Example 1 (0.002 in). Resins B and C are the same materials that are used in Comparative Example 1. Resin A is an HDPE homopolymer with a density of 0.960 g/cm$^3$ and a MI$_2$ of 1.1 dg/min. Resin A contains 500 ppm of a nucleating agent (Hyperform® HPN-20E is from Milliken and Company) used to improve the water vapor barrier properties of the film. The three-layer film structure is arranged as a B/A/C film structure, where percentage of the total film taken by each layer is 35%/50%/15%. Curl testing is performed on Comparative Example 4 in a manner identical to the test used on Comparative Example 1, and the results are presented in Table 1. Comparative Example 4 curls away from the C layer direction. Water vapor transmission rates are measured at 100% relative humidity following the method of ASTM F1249. The 1% secant modulus in the machine direction is measured following the method of ASTM E111. Water vapor transmission rate and modulus are tabulated in Table 1.

Example 5

A four-layer film is produced using the same film equipment and processing conditions as used in Comparative Example 4. This film has the same thickness as the film in Comparative Example 4 (0.002 in). Identical resins A, B and C are used to produce this film structure. The four-layer structure is arranged as a B/A/B/C film, where the percentage of the total film in each layer was 20%/50%/15%/15%. The total fraction of the film taken up by the combined B layers is 35%, which is identical to the B fraction in Comparative Example 4. Curl testing is performed on Example 5 in a manner identical to the test used on Comparative Example 1, and the results are presented in Table 1. Example 5 curls toward the C layer direction (the direction opposite of the curl direction of Comparative example 4). Example 5 curls less than Comparative Example 4, as indicated by the higher radii of curvature. Water vapor transmission rate is measured at 100% relative humidity following the method of ASTM F1249. The 1% secant modulus in the machine direction is measured following the method of ASTM E111. Water vapor transmission rate and modulus are tabulated in Table 1. The water vapor transmission rate and modulus are essentially the same as Comparative Example 4.

Example 6

A four-layer film is produced using the same film equipment and processing conditions as used in Comparative Example 4. This film has the same thickness as the film in Comparative Example 4 (0.002 in). Identical resins A, B and C are used to produce this film structure. The four-layer structure is arranged as a B/A/B/C film, where the percentage of the total film in each layer was 25%/50%/10%/15%. The total fraction of the film taken up by the combined B layers is 35%, which is identical to the B fraction in Comparative Example 4. Curl testing is performed on Example 6 in a manner identical to the test used on Comparative Example 1, and the results are presented in Table 1. Example 6 essentially does not curl at all. Water vapor transmission rate is measured at 100% relative humidity following the method of ASTM F1249. The 1% secant modulus in the machine direction is measured following the method of ASTM E111. Water vapor transmission rate and modulus are tabulated in Table 1. The water vapor transmission rate and modulus are essentially the same as Comparative Example 4.

TABLE 1

RESULTS SUMMARY

| Ex. No. | MD Curvature Radius, mm | TD Curvature Radius, mm | WVTR g/m$^2$/day | 1% Secant Modulus, kpsi |
|---|---|---|---|---|
| C1 | 3 | 5 | 2.0 | 114 |
| 2 | 10 | 12 | 2.0 | 114 |
| 3 | 14 | 34 | 2.1 | 116 |
| C4 | 7 | 20 | 2.0 | 117 |
| 5 | 9 | 25 | 2.0 | 117 |
| 6 | No Curl | No Curl | 2.0 | 119 |

I claim:

1. A multilayer film having a general structure of A/B/A/C or B/A/B/C, wherein A is a nucleated high density polyethylene (HDPE) layer, B is a single or multilayer structure, and C is a seal layer
   wherein the nucleated HDPE comprises an HDPE and a nucleating agent selected from the group consisting of glycerol alkoxide salts, hexahydrophthalic acid salts, and mixtures thereof
   wherein when the multilayer film has the structure A/B/A/C, A is present in a total amount equal to about 35 wt. %, based upon the total weight of the multilayer film, and wherein when the multilayer film has the structure B/A/B/C, B is present in a total amount equal to about 35 wt. %, based upon the total weight of the multilayer film.

2. The multilayer film of claim 1, wherein C is selected from the group consisting of linear low density polyethylene (LLDPE), low density polyethylene (LDPE), ethylene-vinyl acetate copolymers (EVA), polyolefin ionomers, and mixtures thereof.

3. The multilayer film of claim 1, wherein B is a single HDPE layer or LLDPE layer.

4. The multilayer film of claim 1, having the general structure of A/B/A/C.

5. The multilayer film of claim 4, wherein B is a multilayer structure of tie layer/barrier layer/tie layer.

6. The multilayer film of claim 5, wherein the barrier layer is an ethylene-vinyl alcohol copolymer layer or a polyamide layer.

7. The multilayer film of claim 5, wherein the tie layer comprises a maleated polyolefin.

8. A method for reducing or eliminating the curling of a multilayer film having a general structure of A/B/C or B/A/C, said method comprising adding a layer to the multilayer film to form a new film structure of A/B/A/C or B/A/B/C; wherein A is a nucleated high density polyethylene (HDPE) layer, B is a single or multilayer structure, and C is a seal layer
   wherein the nucleated HDPE comprises an HDPE and a nucleating agent selected from the group consisting of glycerol alkoxide salts, hexahydrophthalic acid salts, and mixtures thereof
   wherein when the multilayer film has the structure A/B/A/C, A is present in a total amount equal to about 35 wt. %, based upon the total weight of the multilayer film, and wherein when the multilayer film has the structure B/A/B/C, B is present in a total amount equal to about 35 wt. %, based upon the total weight of the multilayer film.

9. The method of claim 8, wherein C is selected from the group consisting of LLDPE, LDPE, EVA, polyolefin ionomers, and mixtures thereof.

10. The method of claim 8, wherein B is a single HDPE layer or LLDPE layer.

11. The method of claim 10, wherein the new film structure is A/B/A/C.

12. The method of claim 11, wherein B is a multilayer structure of tie layer/barrier layer/tie layer.

13. The method of claim 12, wherein the barrier layer is an ethylene-vinyl alcohol copolymer layer or a polyamide layer.

14. The method of claim 12, wherein the tie layer comprises a maleated polyolefin.

15. An article which comprises the multilayer film of claim 1.

* * * * *